United States Patent
Roush

(10) Patent No.: US 9,110,773 B2
(45) Date of Patent: Aug. 18, 2015

(54) AUTOMATED COLLATING CONVEYOR SYSTEM

(71) Applicant: Dennis Roush, Bluffton, IN (US)

(72) Inventor: Dennis Roush, Bluffton, IN (US)

(73) Assignee: Pretzels, Inc., Bluffton, IN (US)

( * ) Notice: Subject to any disclaimer, the term of this patent is extended or adjusted under 35 U.S.C. 154(b) by 105 days.

(21) Appl. No.: 13/746,823

(22) Filed: Jan. 22, 2013

(65) Prior Publication Data

US 2014/0207276 A1    Jul. 24, 2014

(51) Int. Cl.
| | |
|---|---|
| *B65G 47/32* | (2006.01) |
| *B65G 41/00* | (2006.01) |
| *B65G 43/08* | (2006.01) |
| *B65G 47/08* | (2006.01) |
| *G06F 17/00* | (2006.01) |
| *B65G 47/248* | (2006.01) |

(52) U.S. Cl.
CPC .............. *G06F 17/00* (2013.01); *B65G 41/002* (2013.01); *B65G 47/248* (2013.01); *B65G 47/32* (2013.01)

(58) Field of Classification Search
None
See application file for complete search history.

(56) References Cited

U.S. PATENT DOCUMENTS

| | | | |
|---|---|---|---|
| 2,577,926 A | | 12/1951 | Stiles |
| 4,476,973 A | * | 10/1984 | Kessler et al. ................ 198/744 |
| 4,773,524 A | * | 9/1988 | Greeves ........................ 198/428 |
| 5,178,263 A | | 1/1993 | Kempen |
| 5,205,400 A | | 4/1993 | Breuss |
| 5,540,795 A | * | 7/1996 | Franklin et al. ................. 156/64 |
| 5,558,488 A | * | 9/1996 | Gentry ....................... 414/790.4 |
| 5,941,365 A | | 8/1999 | Ritter |
| 6,092,645 A | | 7/2000 | Wahren |
| 7,234,590 B1 | | 6/2007 | Le Borgne |
| 2007/0151831 A1 | | 7/2007 | Le Borne |

* cited by examiner

*Primary Examiner* — Kavel Singh
(74) *Attorney, Agent, or Firm* — C. John Brannon; Brannon Sowers & Cracraft PC

(57) ABSTRACT

A method of moving and boxing packages, including positioning a conveyor belt assembly having distal and proximal ends to receive a package at the distal end, sending a signal when a first package is placed upon the distal end, generating an air pulse to reorient the first package into a predetermined orientation, moving the first package to a loading area, and removing the first package into a shipping container. Next, the first package is moved far enough to make room for a second package, a second package is placed onto the distal end, a signal is sent when the second package is placed upon the distal end, and an air pulse is generated to reorient the second package into a predetermined orientation.

14 Claims, 5 Drawing Sheets

AUTOMATED COLLATING CONVEYOR SYSTEM

TECHNICAL FIELD OF THE INVENTION

The novel technology relates generally to mechanical conveyance, and more particularly to a portable collating conveyor system for delivering packages from a packing machine to be loaded for transport.

BACKGROUND OF THE INVENTION

Preparing and boxing smaller packages for transport is a repetitive task; thus, any small inefficiencies in the process are multiplied over time to become substantial losses of productivity. In the food packaging industry, conveyor belt systems are commonly used to move small packages from packaging machines to be boxed for transport to warehouses or points of sale. As seen in FIG. 1, such conveyor systems are semi-permanently emplaced, require two motors to drive two endless belt systems, and are inefficient. In particular, the standard conveyor systems have a first endless belt that catches a product, such as a bag, which is encouraged to fall forward. The belt conveys the bag up an incline and onto and over a separate hump. The bag passes a sensor, such as an electric eye, which actuates a paddle or bumper to reorient the bag as the bag travels onto a second endless belt. The second belt carries the bag to its destination where it is packed into a box or the like for shipping.

This system, while virtually ubiquitous in the industry, is inherently inefficient. It is cumbersome to navigate, unnecessarily bulky, requires two motors to run two endless belts, and has an excessive number of moving parts, requiring frequent maintenance and even then making it unnecessarily prone to breakdown. Further, this system delivers bags or packages one at a time at a rate that is determined by the dimensions (length) of an individual bag.

Thus, there remains a need for an improved conveyance system for use in moving packed or packaged items to a final boxing destination, and, more generally, for a more efficient industrial conveyor system. The novel technology addresses this need.

SUMMARY OF THE INVENTION

The novel technology relates to a conveyor system for moving industrial packages. The novel technology includes a system described as follows:

A conveyor system, specifically collating conveyor system that can be used as a "pack off" conveyor or as a "continuous feed" conveyor.

The conveyor system of the novel technology further comprises a human operable control comprising analog dials to select belt speed, spacing between conveyed items, and conveyed item size.

Electronic sensor means are provided with the novel technology to determine the presence or absence of an object to be conveyed along the belt, thus allowing the conveyor of the present system to automatically start and stop based on need as opposed to running constantly.

The present conveyor system further comprises means to raise and lower the conveyor system for ergonomic purposes.

The present conveyor system is also modular, in that the length of the conveyor system is infinitely adjustable by merely adding an additional "leaf", and adding a longer belt while using the same belt motor and control device.

The belt motor and control provide, as stated earlier, variable speed and spacing of the conveyed objects.

The novel technology further comprises a variable pressure "air knife" for automatically blowing onto conveyed items to re-orient the same relative to the conveyor belt.

One object of the novel technology is to provide an improved conveyor system. Related objects and advantages of the novel technology will be apparent from the following description.

DETAILED DESCRIPTION OF THE PREFERRED EMBODIMENTS

Figure 1:
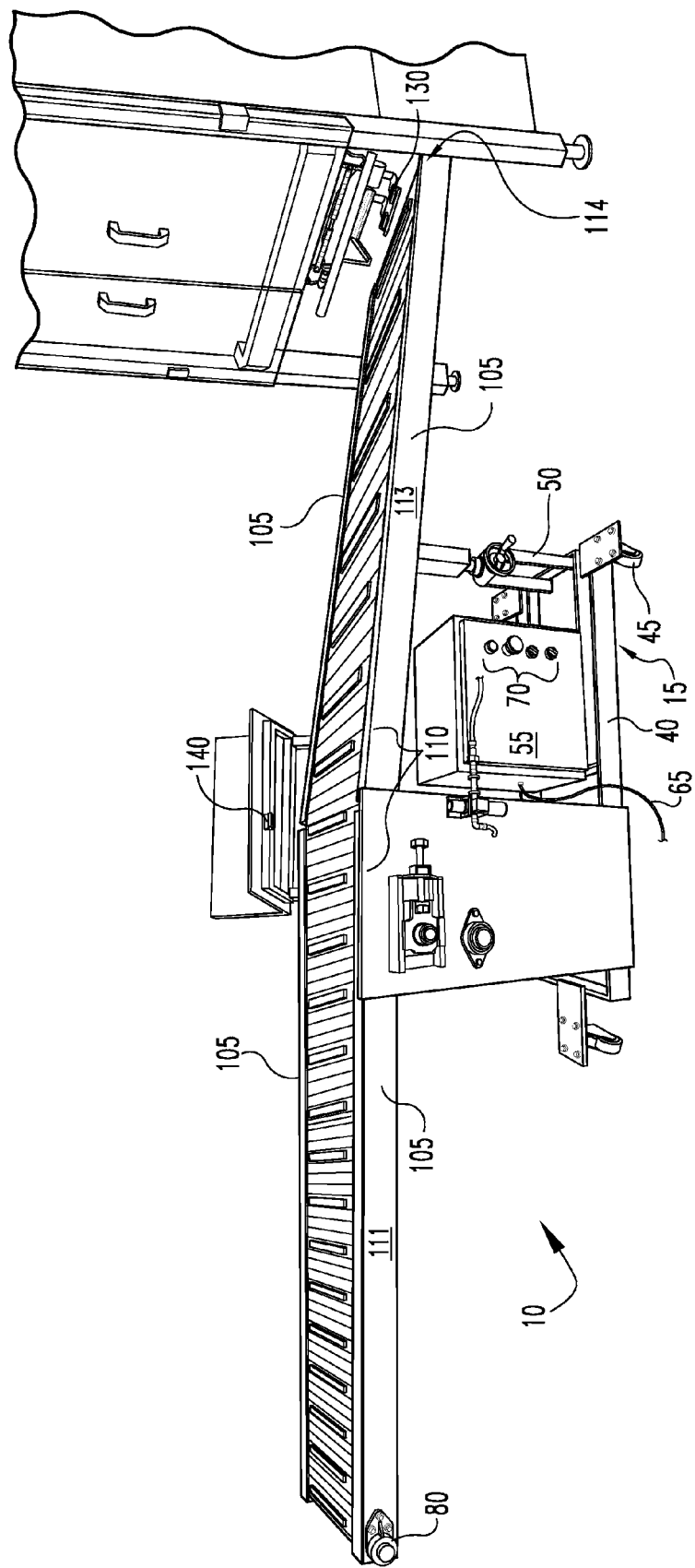
FIG. 1 is a perspective view of a first embodiment conveyor assembly of the novel technology.

For the purposes of promoting an understanding of the principles of the invention and presenting its currently understood best mode of operation, reference will now be made to the embodiments illustrated in the drawings and specific language will be used to describe the same. It will nevertheless be understood that no limitation of the scope of the invention is thereby intended, with such alterations and further modifications in the illustrated device and such further applications of the principles of the invention as illustrated therein being contemplated as would normally occur to one skilled in the art to which the invention relates.

Figure 2:
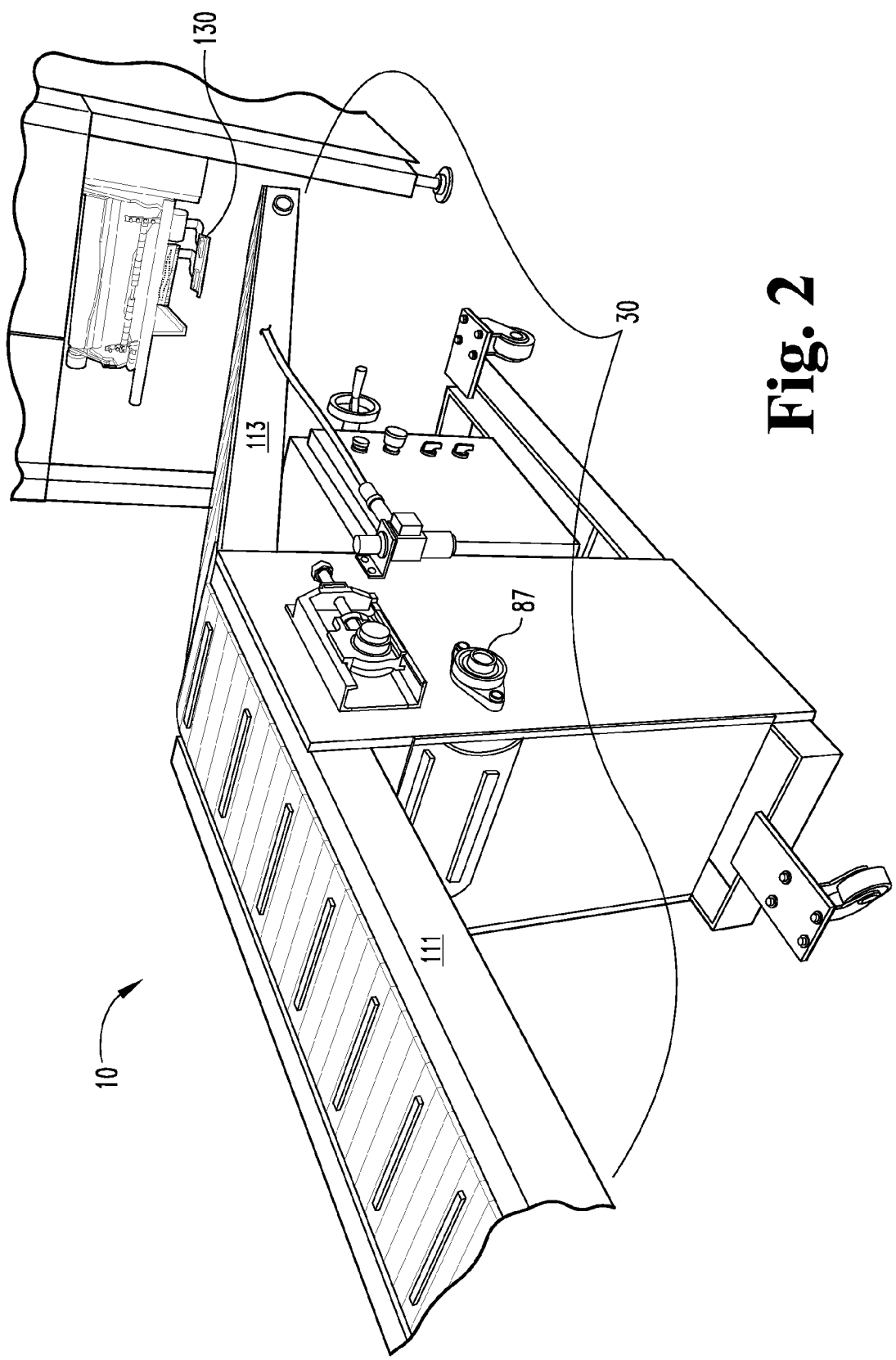
FIG. 2 is a first partial perspective view of the embodiment of FIG. 1 showing the motor assembly.
Figure 3:
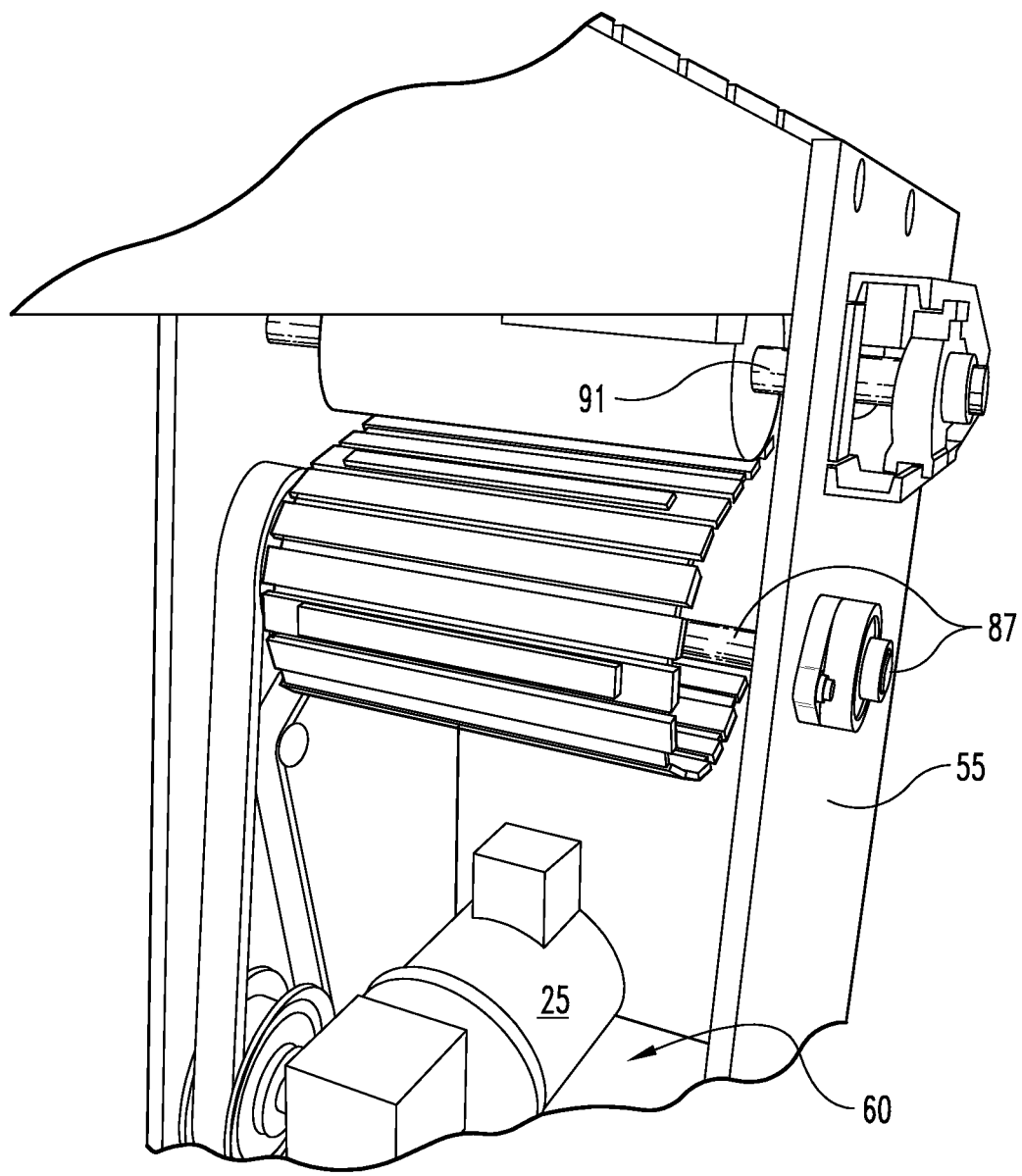
FIG. 3 is a second enlarged partial perspective view of the embodiment of FIG. 1.
Figure 4:
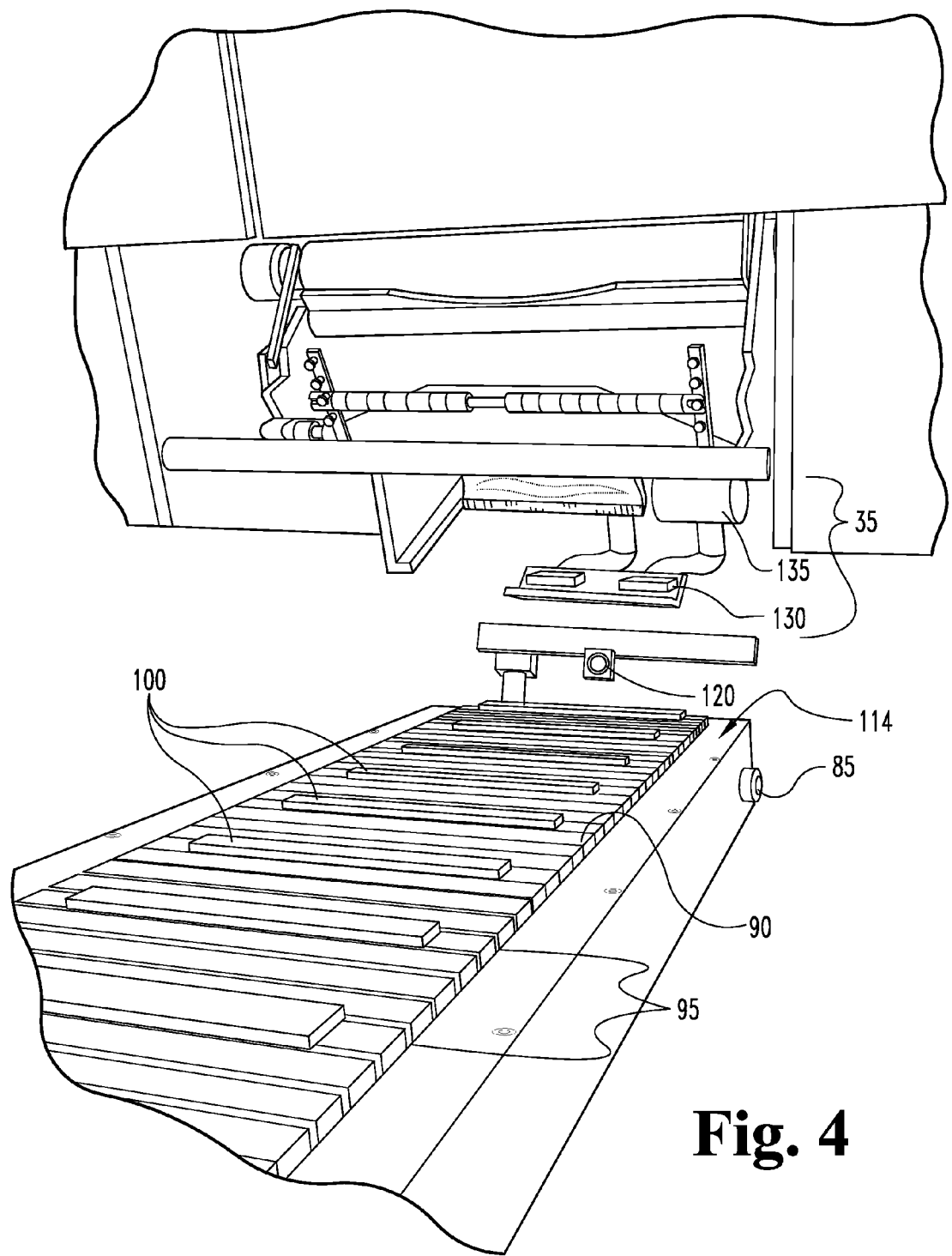
FIG. 4 is a partial perspective view of the assembly of FIG. 1 showing the distal end and air jet assembly.
Figure 5:
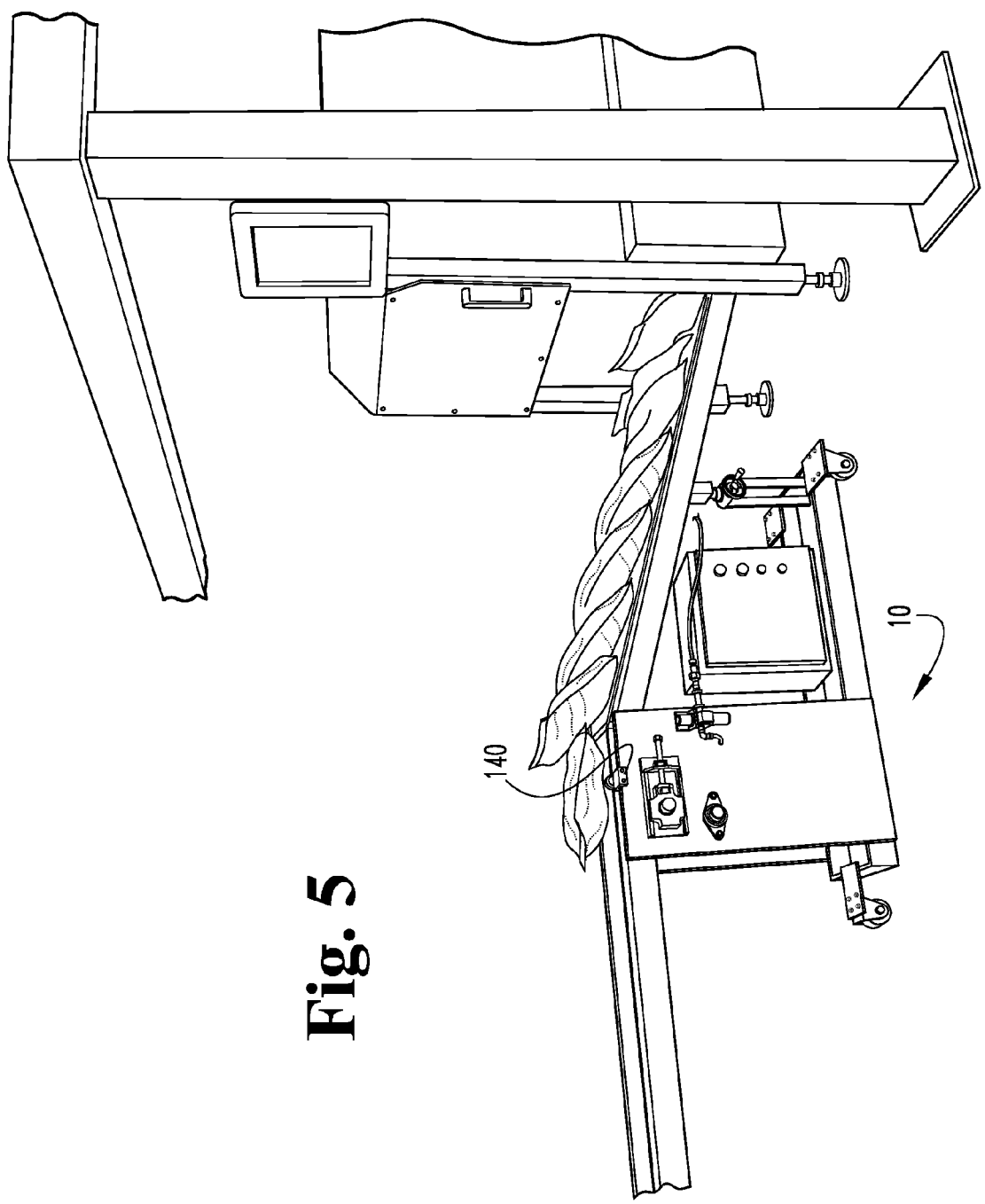
FIG. 5 is a partial perspective view of FIG. 1 as loaded with bags.

FIGS. 1-5 relate to a first embodiment of the novel technology, a modular mobile conveyor system 10 including a wheeled chassis assembly 15, a motor 20 mounted in the chassis assembly 15, an electronic controller 25 operationally connected to the motor 20 and typically mounted in the chassis 15, an endless belt assembly 30 mounted in the chassis 15, and a pneumatic jet "air knife" assembly 35 operationally connected to the electronic controller 25.

The chassis assembly 15 further includes a generally flat support platform 40. The support platform 40 may be a solid generally flat member, or may be defined by a plurality of elongated members 41 connected to define a framework 43. A plurality of wheels, castors, or like members 45 are connected to the support platform 40 to provide mobility. The wheels 45 extend in a downward direction from the support member 40 when positioned for normal use. The chassis assembly 15 further includes a first support member 50 connected to the support platform 40 and extending upwardly (in a direction opposite the first, downward direction) from the support platform 40. The first support member 50 is typically of variable length, and may include an actuator 51, such as a crank, pneumatic or hydraulic cylinder, electric motor, or the like, for manually or automatically varying the length of the member 50. A second support member 55 likewise is connected to and extends upwardly from platform 40. The second member 55 may likewise be of variable length, but more typically is a rigid structural member and includes motor mounting members 60 attached thereto. A power supply 65 is operationally connected to the chassis 15 for powering the motor 20 and the controller 25. The power supply 65 may be self-contained, such as a battery pack, or may simply be line current connected to the chassis 15 by cable means or the like. A control interface 70 operationally connected to the controller 25 is also typically connected to the chassis 15.

The belt assembly 30 includes first and second pulleys or cylindrical members 80, 85 operationally connected to the chassis 15. The pulleys 80, 85 may be elongated cylindrical rods or the like, and optionally are oriented parallel to one another and are spaced to define the operational length of the conveyor system 10. A motor pulley 87 is operationally connected to the motor 20 and directly engages the endless belt 90 to move the belt 90. The endless belt 90 is looped about the pulleys 80, 85 and is operationally connected to the motor 20 via the motor pulley 87, such that the motor 20 may be energized to urge the belt 90 to travel around the pulleys 80, 85. The belt 90 may be made up of a plurality of generally identical leaves or sections 95, each section 95 connected to another 95 section at either end to define an endless loop. Energization of the motor 20 urges any given leaf 95 to travel over the first pulley 80 to the second pulley 85, over the second pulley 85 and back to the first pulley 80, typically engaging additional pulleys or cylindrical members 91 along the way to define the path of the belt 90. Each leaf 95 further typically includes one or more raised portions 100 for engaging packages or items placed on the belt 90. Typically, at least one, and more typically a pair of parallel, spaced elongated frame members 105 is/are positioned adjacent and parallel to the endless belt 90 to reinforce and define an elongated belt housing portion 110. More typically, the elongated belt housing portion 110 includes a generally horizontal portion 111 hingedly or pivotably coupled to a second portion 113 that extends away from the horizontal portion 111. The second portion 113 may be pivoted at an angle such that the distal end 114 of the elongated belt housing portion 110 is positioned closer to the ground. The second portion 113 is typically supported by member 50, and actuator 51 is more typically connected to controller 25.

A package sensor 120, typically an optical sensor or the like, is positioned adjacent the distal end 114. The sensor 120 is operationally connected to the electronic controller 25. An air jet or air knife 130 is positioned adjacent the sensor 120 and operationally connected to the electronic controller 25 and connected in pneumatic communication with a pneumatic source 135.

Additional sensors 140 are typically positioned at predetermined locations along the elongated belt housing portion 110 and connected in electric communication with the electronic controller 25 to provide information about the presence or absence of load items on the belt assembly 30.

In operation, the conveyor assembly 10 is positioned such that the distal end 114 of the elongated belt housing portion 110 is positioned to receive a package dispensed from a production unit, such as a bagging or packaging machine. Such a package dropping onto the elongated belt housing portion 110 triggers the sensor 120 to send a signal to the electronic controller, and likewise (either directly or relayed through the controller 25) to the air knife 130. The air knife sends a short burst of pressurized air to position the package on the endless belt 30. The duration and intensity of the air blast is typically configured to a specific package size and mass; such configuration may be predetermined and the air knife 130 be calibrated accordingly, or air knife 130 may be calibrated in response to input from the sensor 120 and/or manual input through the interface 70.

Once the package is correctly oriented by the air knife 130, the motor 20 is energized to engage the belt 30 to move the package away from the distal end 114 of the elongated belt housing portion 110. The speed of the belt 30 is controlled by the controller 25, and may be varied to control spacing and orientation of the conveyed items.

The controller 25 may be coupled to the actuator 51, such that the controller 25 may energize actuator 51 to change the length of member 50 and move distal end 114 of second portion 113 into a new desired position or elevation. Likewise, member 55 may be coupled to an actuator 51 connected to the controller 25, and controller 25 may likewise energize actuator 51 to change the length of member 55 and move first portion 111 into a new desired position or elevation. First portion 111 is typically oriented horizontally at all times, and changes in length of member 55 simply change the elevation (i.e., raise or lower) first portion 111. More typically, specific lengths of member 55 corresponding to elevations of first portion 111 are stored in controller 25 and respectively paired with codes (such as operator codes), such that different elevations of first portion 111 may be easily actuated.

While the invention has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the invention are desired to be protected.

What is claimed is:

1. A conveyor assembly, comprising in combination:
   a wheeled base portion;
   at least one extendible support member connected to the wheeled base portion;
   an elongated belt housing portion connected to the at least one extendible support member, wherein the elongated belt portion defines a proximal end and a distal end;
   a single endless belt loop operationally connected to the elongated belt housing portion;
   a drive motor operationally connected to the endless belt;
   a microprocessor operationally connected to the drive motor;
   an air jet disposed at the distal end and operationally connected to the microprocessor for positioning and orienting a package received at the distal end;
   a sensor positioned at the distal end and operationally connected to the microprocessor; and
   a control interface operationally connected to the microprocessor;
   wherein the air jet is sufficiently powerful to reorient a package received at the distal end; and
   wherein the air jet is sufficiently powerful to reposition a package received at the distal end.

2. The conveyor assembly of claim 1 wherein the elongated belt housing portion further comprises a pair of oppositely disposed parallel elongated sidewalls; and further comprising a pair of spaced roller support members, each respective roller support member extending between the sidewalls and operationally engaging the single endless belt loop.

3. The conveyor assembly of claim 1 wherein the elongated belt housing portion further comprises an elongated first portion and an elongated second portion hingedly connected to the elongated first portion; wherein the intersection of the elongated first and second portions defines an angle of intersection.

4. The conveyor assembly of claim 3 wherein the elongated second portion is operationally connected to the at least one extendible support member, and wherein the at least one extendible support member may be actuated to change the angle of intersection.

5. The conveyor assembly of claim 1 and further comprising a pneumatic source operationally connected to the air jet and to the at least one extendible support member; wherein the at least one extendible support member is pneumatically actuated; and wherein the electronic controller energizes pneumatic actuation of the at least one extendible support member.

6. The conveyor assembly of claim 1 wherein the single endless belt loop is comprised of a plurality of connected leaves.

7. A conveyor assembly, comprising in combination:
a movable housing portion;
a single endless belt loop defining an elongated conveyor member, wherein the conveyor member has a distal end;
a drive motor connected to the housing portion and operationally connected to the endless belt;
a variable length support member connected to the housing and to the elongated conveyor member;
an air jet operationally connected to the elongated conveyor member and connectable to a pneumatic source;
a sensor operationally connected to the elongated conveyor member;
a microprocessor operationally connected to the drive motor, the air jet, and the sensor;
a control interface operationally connected to the microprocessor;
wherein varying the length of the variable length support member varies elevation of the distal end;
wherein the distal end is positionable to receive packages;
wherein the air jet is calibrated to emit an air blast sufficient to reorient a package.

8. The assembly of claim 7 further comprising an actuator operationally coupled to the variable length support member and electrically connected to the microprocessor, wherein the microprocessor is programmed to energize the actuator to vary the length of the variable length support member.

9. The assembly of claim 8 wherein the actuator is a cylinder assembly.

10. The assembly of claim 7 wherein placement of a package onto the distal end sends a first signal from the sensor to the microprocessor; upon receipt of the first signal, the microprocessor energizes the motor to engage the endless belt loop at a predetermined speed and to energize the air jet to deliver an air blast of a predetermined intensity to the package to yield a predetermined package orientation.

11. A method of moving and boxing packages, comprising:
a) positioning a conveyor belt assembly having a distal end and a proximal end to receive a package at the distal end;
b) sending a signal when a first package is placed upon the distal end;
c) generating an air pulse to reorient the first package into a predetermined orientation;
d) moving the first package to a loading area;
e) moving the first package from the conveyor belt assembly into a shipping container
f) after c) and before d), moving the first package far enough to make room for a second package;
g) after f), placing the second package onto the distal end;
h) sending a signal when the second package is placed upon the distal end; and
i) generating an air pulse to reorient the second package into the predetermined orientation.

12. The method of claim 11 wherein a microprocessor controls movement of the packages and timing and intensity of air pulses to yield a predetermined spacing and orientation of packages as well as a predetermined package delivery rate.

13. The method of claim 11 and further comprising:
j) repositioning the loading area to ergonomically benefit an operator.

14. The method of claim 13 wherein a plurality of loading area positions are stored in the microprocessor; and wherein each respective loading area position is paired with an individual operator code.

* * * * *